ic Office 2,951,675
Patented Sept. 6, 1960

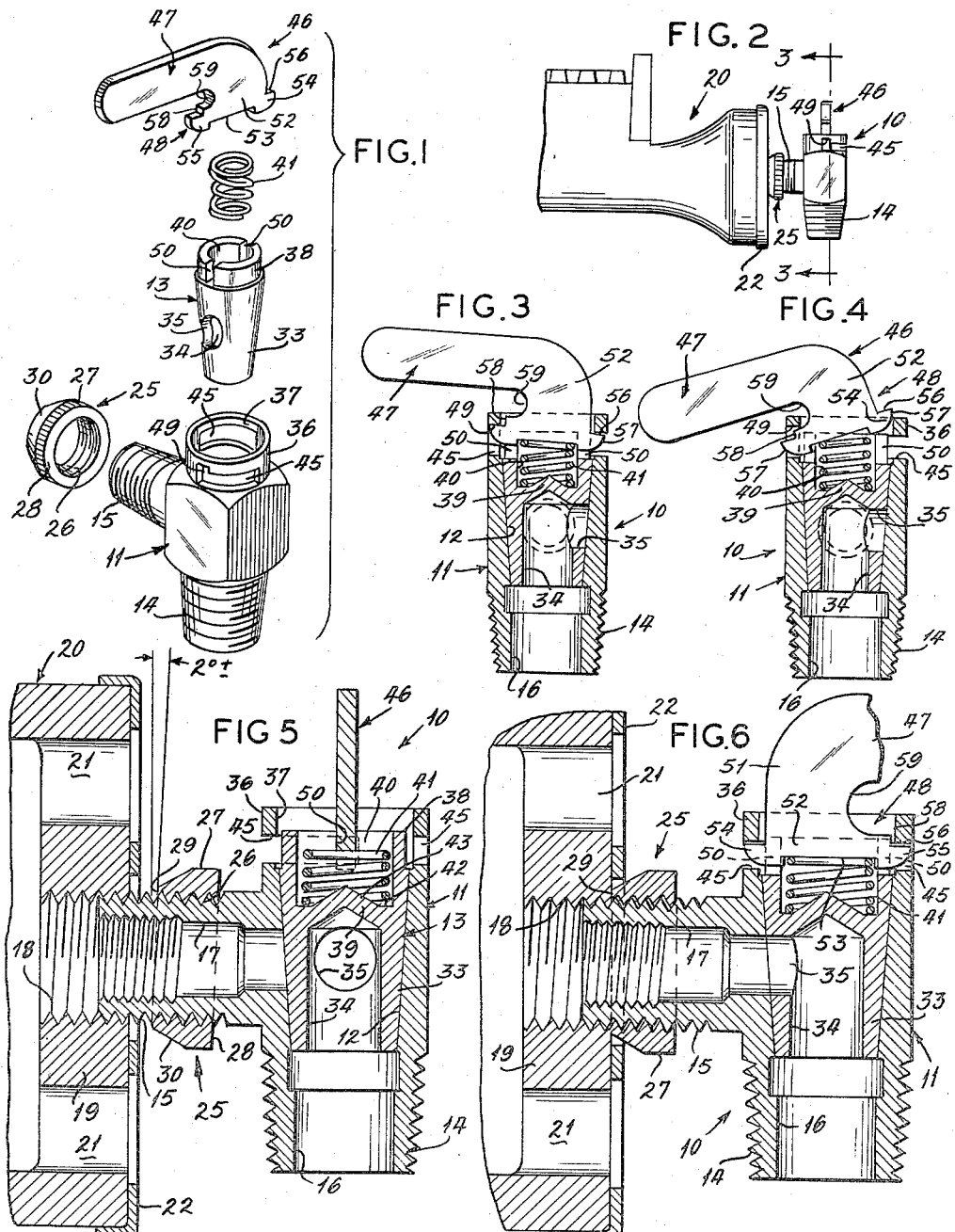

2,951,675

VALVE CONSTRUCTION

Stanley F. Jackes, University City, and Joseph N. Miller, Overland, Mo., assignors to Jackes-Evans Manufacturing Company, St. Louis, Mo., a corporation of Missouri Filed Mar. 21, 1958, Ser. No. 723,008

6 Claims. (Cl. 251—97)

This invention relates generally to valves and more particularly to a rotary plug-type valve with actuator disabling means and locking means for assembling the valve on a gas burner or the like.

A principal object of the present invention is to provide an improved valve of simplified construction whereby manufacture and assembly of the component parts is facilitated. Another object is to provide a valve having an improved safety lock arrangement preventing accidental opening of the valve. Another object is to provide a valve having component parts that are quickly and easily assembled or disassembled without the use of tools. Still another object of the present invention is to provide improved means for connecting the valve in assembled relation with a gas burner or other part to which the flow of fluid is controlled by the valve, the improved connecting or locking means being operated without the use of tools.

Still other objects and advantages of the present invention will become apparent hereinafter.

Briefly, the invention comprises a valve having a body portion in which a rotary plug is movable between closed and open positions, an actuator engaged with the plug for turning it between the positions, the actuator having retaining tabs received in guide slots formed in the body portion, spring means between the plug and actuator, locking means cooperable with one of the tabs of the actuator to prevent rotation of the plug from closed position. The invention is also embodied in an improved means for connecting the valve body portion to an element.

The invention also consists in the parts and in the combinations and arrangements of parts hereinafter described and claimed. In the accompanying drawing which forms a part of this specification and wherein like numerals refer to like parts wherever they occur:

Fig. 1 is an exploded perspective view of the components of a valve embodying the present invention, Fig. 2 is a side elevational view of the valve assembled on a gas burner or the like, the handle being turned to valve closed position, Fig. 3 is a vertical cross sectional view of the valve with the handle in valve closed position, Fig. 3 being taken substantially along line 3—3 of Fig. 2, Fig. 4 is a view similar to Fig. 3, but showing the handle being removed from the valve to disassemble the components of the valve, Fig. 5 is a greatly enlarged cross sectional view showing the valve being connected to a gas burner by a novel lock nut, and Fig. 6 is a greatly enlarged cross sectional view, but showing the lock nut in locking condition with the burner and valve and showing the valve in valve open position.

Referring now to the drawing, the invention is embodied in a manually controlled valve 10 of the rotary plug-type, such as is adapted especially for regulating gas flow in domestic or commercial heating or cooking appliances although it is apparent that the valve may also be used for controlling fluid flow in other apparatus.

The valve 10 comprises a body portion or casing 11 having a frusto-conical bore 12 in which a plug member 13 is positioned for rotation between a valve open or "on" position, Fig. 6, and a valve closed or "off" position, Figs. 3, 4 and 5. The body portion 11 has projecting threaded nipples 14 and 15 in which inlet and outlet ports 16 and 17 are formed in communication with the plug bore 12. The body portion illustrated in the drawing has the inlet port 16 in axial alignment with the plug bore 12 and the outlet port 17 formed transversely of the bore whereby an angular gas flow passage is provided. However, the nipples 14 and 15 may project from the body portion 11 in other relationships to provide aligned, offset or other angularly related ports in communication with the plug bore 12 without departing from the invention. The inlet nipple 14 is adapted to be connected to a conventional gas line fitting (not shown) or the like, and the outlet nipple 15 is adapted to be received into a threaded bore 18 formed in the end wall 19 of a conventional burner 20 or the like. The burner 20 also includes the usual air intake openings 21 and an adjustable cover plate 22 therefor.

An improved lock nut 25 is provided for releasably securing the outlet nipple 15 in the threaded bore 18 of the burner 20 to support the valve 10 thereon. The lock nut 25 has a threaded bore 26 complementary to the external threaded surface of the nipple 15, the threaded bore 26 being similar to the threaded bore 18 of the burner 20. The nut 25 also has a serrated or knurled circumferential surface 27 and a radial end wall 28. The improvement of the present locking nut 25 resides in an abutment end wall 29 extending outwardly from the bore 26, the wall 29 being annular and relatively narrow so as to form only an extremely limited area for contact with the end wall 19 of the burner about the bore 18 therein. A frusto-conical circumferential surface 30 is formed between the abutment wall 29 and the surface 27.

As shown best in Fig. 5, the abutment wall 29 is in a plane extending at an angle to a plane perpendicular to the axis of the lock nut bore 26, for instance, two degrees. In other words, the abutment surface 29 is angularly related to the surface of the part that it contacts prior to being turned into locking position therewith. Accordingly, when the nipple 15 of the valve 10 is turned into the threaded bore 18 of the burner 20 to loosely position the valve 10 in assembled position, the lock nut 25 is then turned to bring it into abutment with the end wall 19 of the burner. Inasmuch as the coacting surfaces 19 and 29 of the burner 20 and lock nut 25 are angularly related, the lock nut will tilt axially as it is tightened against the burner to bring the coacting surfaces into contact. The angular axial tilting of the threaded bore 26 of the lock nut 25 exerts a force on the threaded nipple 15 tending to tilt it axially in the threaded bore 18 of the burner whereby a wedging action occurs between the threads of the nipple 15 and the threads of the bores 18 and 26. At the same time, of course, the lock nut 25 is exerting an axial pressure on the threads of the nipple 15 causing them to be backed outwardly relative to the threaded bore 18. The resulting effect of the action of the present lock nut 25 is that an airtight seal is provided between the threads of the nipple 15 and bore 18 and the valve 10 is secured firmly to the burner 20 as tightly as if some tool (not shown) had been used, but without requiring the use of such an instrument.

The plug member 13 comprises a frusto-conical body 33 complementary to the bore 12 of the valve body portion 11, the body 33 having an axial inlet bore 34 for communication with the inlet port 16 and a radial outlet bore 35 formed through the wall of body 33 to provide communication between the axial bore 34 and the outlet port 17 when the plug 13 is in valve open position, Fig. 6. It is apparent that the bores 34 and 35 may be formed in other relationships to correspond to the aligned, offset or angular relationship of the nipples 14 and 15 of the valve body 11. The valve 10 has an open ended annular wall 36 formed on the body portion 11, the wall 36 having an opening 37 extending from the large end of the tapered bore 12. The plug 13 is received into the bore 12 through the opening 37, and the plug 13 also has an annular wall extension or sleeve 38 extending from the body 33. A dividing wall 39 is provided between the body 33 and sleeve 38. The sleeve 38 and wall 39 define a chamber 40 for receiving a spring member 41 or the like, the wall 39 having a flat peripheral surface 42 for seating one end of the spring member 41 and a conical central surface 43 forming a core for the spring member.

Referring particularly to Figs. 1, 5 and 6 it will be seen that the annular wall 36 of the valve body 11 has opposed slots 45 formed therein, the slots each extending circumferentially of the wall 36 and forming a keyway for an actuator member 46 including a handle portion 47 and a control portion 48. One end of one slot 45 is provided with an upwardly formed notch 49 for locking the actuator 46 in valve closed position, as will appear hereinafter. The upper or free end of the sleeve 38 of the plug 13 is positioned approximately at the upper margin of the slots 45 when the plug 13 is assembled with the valve body 11. The sleeve 38 has diametrally aligned axially-extending notches or slots 50 formed therein for cooperation with the actuator 46.

The actuator 46 is provided for turning the plug 13 between open and closed positions, and the spring member 41 cooperates with the actuator 46 to maintain the plug 13 in sealed condition in the bore 12 to prevent leakage therebetween. The actuator is preferably formed from relatively flat stock, and the control portion 48 extends diametrally across the opening 37 and chamber 40 between opposite sides of the annular walls 36 and 38 of the valve body 11 and plug 13, respectively. The handle 47 extends radially and is connected with the central part 52 of the control portion 48, the central part 52 extending axially and having a central recess or notch 53 for receiving the end of the spring member 41 therein. Outwardly extending lugs or keys 54 and 55 are provided on opposite sides of the central part 52, the lug 55 being positioned in the slot 45 having the lock notch 49 and being on the same side of the actuator as the handle 47. The other lug 54 is received in the slot 45 opposite thereto and the lugs have upper abutment surfaces 56 to prevent the accidental displacement of the actuator from assembled condition with the valve body 11 and plug 13. The lugs also have curved lower and side margins 57 to facilitate assembly or removal of the actuator 46 without tools and in a quick and easy manner when it is desired to do so.

A stepped abutment 58 is provided between the lug 55 and central part 52, and the central part 52 is cut away to provide a marginal clearance, at 59, deeper than the length of the lug 54 from the central part 52 to the free end thereof.

As shown in the drawings, the spring member 41 extends between the plug 13 and the actuator 46 biasing the former into the bore 12 of the valve body 11 and biasing the latter outwardly to maintain the abutment surfaces 56 of the lugs 54 and 55 in sliding contact with the upper margins of the slots 45. When the actuator 46 is turned to valve closed position, Figs. 2, 3 and 5, the outlet bore 35 in the plug 13 is out of communication with the bore 17 of the outlet nipple 15 so that no fluid will flow through the outlet. In this position, the actuator 46 is aligned with the lock notch 49 and the spring member 41 biases the lug 55 upwardly into the notch whereby the actuator is disabled to prevent accidental turning of the plug to the valve open position. To turn the plug 13 approximately 90° to valve open position, the actuator handle 47 must be depressed to bring the surface 56 of the lug 55 below the upper margin of the slot 45.

Referring to Fig. 4, it will be seen that the actuator 46 may be removed from the valve body 11 to permit the spring member 41 and plug 13 to be removed. This is easily performed without the use of tools by first turning the actuator to valve closed position whereby the lug 55 and abutment 58 are aligned with the notch 49. The distance between the upper margin of the notch 49 and the lower margin of the slot 45 is greater than the distance between the curved lower margin 57 of the lug 55 and the top of the stepped abutment 58. Accordingly, the handle 47 may be held depressed and the entire actuator 46 moved radially outwardly so that the portion of the wall 36 between the notch 49 and the free margin of the wall is received in the clearance 59. Thus, the lug 54 is moved out of the slot 45 and the actuator rocked to swing the lug 54 upwardly out of the opening 37 whereby the actuator 46 may be removed by withdrawing the lug 55 from the notch 49. The reverse order is followed in assemblying the actuator 46 with the spring 41 and valve body 11.

It is now apparent that a greatly improved simplified valve construction is provided including a novel actuator that can be assembled or removed from the valve body without tools, and a novel lock nut means for assembling the valve body on a part without requiring tools. The assembled valve construction efficiently maintains the plug 13 in a sealed condition in the valve bore 13, and the actuator can not be turned to a valve open position by accidentally striking the handle. The present construction obviates the need for multiple springs, cross pins for retaining the parts in assembly, and has manifest advantages over prior art valve constructions both in efficiency of operation and simplicity in assembling the parts thereof.

This specification is intended to cover all changes and modifications of the present invention, which will be readily apparent from the disclosure.

What we claim is:

1. In a valve construction including a valve body and a rotary plug mounted in the valve body through one end thereof, the valve body having opposed elongated slots adjacent to the one end and one end of said plug having formed therein an opening and opposed notches aligned with the elongated slots of the valve body, an actuator including lugs positioned in the notches and extending into the elongated slots, yieldable means between the plug and the actuator for biasing the former into sealed position with the valve body and the latter into slidable contact with the valve body, abutment means normally preventing lateral movement of said actuator relative to said plug and valve body, and an opening in the valve body in communication with one of said slots adapted to receive said abutment means permitting lateral movement of said actuator whereby the other lug is movable out of the other slot for removal of the actuator from the valve body.

2. In a valve construction including a valve body and a rotary plug removably positioned in the valve body through one end thereof, the valve body having opposed elongated guide slots adjacent to the one end and said plug having notches aligned with the elongated slots of the valve body, an actuator having lugs engaged in the plug notches and extending into the elongated slots, yieldable means between the plug and the actuator biasing the plug into sealed position with the valve body and the lugs of the actuator into slidable contact with the valve body margins of the elongated slots, said plug being rotatable by said actuator between an off position in which the lugs of the actuator are positioned at one end of the guide slots of the valve body and an on position in which the lugs are positioned at the other end of the guide slots, abutment means normally preventing radial movement of the actuator relative to the valve body and plug, and abutment receiving means radially aligned with the off position end of one of said guide slots for non-rotative lateral movement of said actuator relative to said plug and valve body.

3. A valve construction comprising a valve body having a bore formed in one end and guide slots extending through the body wall adjacent to the one end, a rotary plug positioned in the valve body through the one end thereof having a keyway open toward the one end of the body and diametrally aligned with the guide slots, an actuating key having first and second portions and adapted to rotate the plug between on and off positions in said body, the first portion of said key being slidably received in said keyway and slots, recess means formed in said body in diametral alignment with said keyway in the off position of said plug for receiving the second portion of said key, and yieldable means biasing said body, plug and key into frictional contact and normally biasing said second portion of said key out of said recess means.

4. A valve construction comprising a valve body having a bore formed in one end and opposed circumferential guide slots extending through the body wall adjacent to the one end, a rotary plug positioned in the valve body through the one end thereof and adapted to be turned between an on position and an off position, said plug having a keyway formed in diametral alignment with the guide slots and open toward the one end of the body, an actuating key received in the keyway and slots for rotating said plug between on and off positions, yieldable means biasing said body, plug and key into frictional engagement, said key being movable axially and laterally in said keyway and slots against the biasing action of said spring in the off position of said plug for disassembly of the body, plug, key and yieldable means, and cooperable abutment means between said key and body preventing relative lateral movement between said key and body except in the off position of said plug.

5. In a valve construction, a valve body having a bore, an open end and opposed elongated slots circumferentially formed adjacent to the open end, a notch formed in the valve body in communication with one of said slots, a plug positioned in the valve body bore and having an end within the open end of the valve body, a central opening in said end of the plug and diametrally aligned slots formed in said plug end, an actuator having a pair of lugs positioned in the plug slots and having an axial abutment with the valve body slots, one of said lugs being movable into said notch to lock the plug against movement relative to the valve body, a stepped abutment on the actuator adjacent to one lug adapted to contact the valve body to prevent radial displacement of the other lug from its valve body slot, said stepped abutment being adapted to be moved radially into the notch to permit removal and assembly of the actuator on the valve body, and spring means positioned between the plug and actuator to bias the actuator lugs into abutment with the valve body slots to normally hold the stepped abutment out of alignment with the notch and elongated slots.

6. In a valve construction of the type described, a valve body having a bore, an open end, opposed elongated slots circumferentially disposed adjacent to the open end, and a notch in communication with the end of one of said elongated slots and extending axially therefrom toward the open end, a plug in the valve body bore and having an end within the open end of the valve body, a central opening in said plug end, and diametrally aligned axially extending slots formed in said plug end, said latter slots being aligned radially with the elongated slots in the valve body, an actuator extending diametrally across the open end of the valve body and having lugs on the outer ends thereof, said lugs being positioned in the plug slots and having a circumferential abutment with the plug and extending into the elongated slots of the valve body and having an axial abutment with the valve body, a stepped abutment on said actuator inwardly of one of said lugs and extending axially toward the open end for abutment with the valve body to prevent radial displacement of the other lug from its elongated slot, and a spring positioned in the central opening of the plug and biasing the actuator outwardly for maintaining the stepped abutment out of alignment with the notch, said actuator being movable against the action of said spring to align the stepped abutment with said notch whereby said actuator is adapted to be displaced radially for removal from the valve body.

References Cited in the file of this patent

UNITED STATES PATENTS

| | | |
|---|---|---|
| 945,517 | Goodwin | Jan. 4, 1910 |
| 1,221,771 | Schwall | Apr. 3, 1917 |

FOREIGN PATENTS

| | | |
|---|---|---|
| 111,235 | Germany | June 9, 1900 |
| 392,154 | Great Britain | May 9, 1933 |
| 911,892 | France | Apr. 8, 1946 |